United States Patent [19]

Seragnoli

[11] 4,396,835
[45] Aug. 2, 1983

[54] CONVEYOR SYSTEM FOR THE BULK TRANSFER OF BAR-SHAPED ARTICLES, PARTICULARLY CIGARETTES

[75] Inventor: Enzo Seragnoli, Bologna, Italy

[73] Assignee: G.D Societa per Azioni, Bologna, Italy

[21] Appl. No.: 197,617

[22] Filed: Oct. 16, 1980

[30] Foreign Application Priority Data

Oct. 18, 1979 [IT] Italy .............................. 3513 A/79

[51] Int. Cl.³ ............................................ G01N 21/30
[52] U.S. Cl. ................................ 250/223 R; 250/561
[58] Field of Search ............. 250/223 R, 223 B, 561, 250/570

[56] References Cited
U.S. PATENT DOCUMENTS 3,214,594 10/1965 Thomson ..................... 250/548 X Primary Examiner—David C. Nelms
Assistant Examiner—Darwin R. Hostetter
Attorney, Agent, or Firm—Fitzpatrick, Cella, Harper & Scinto

[57] ABSTRACT

Conveyor system particularly suitable for the bulk transfer of cigarettes from one or more manufacturing machines to one or more packaging machines, and comprising at least one device for controlling the quantity of cigarettes at a determined position.

The control device comprises a plurality of photoemitter elements disposed at different levels relative to the controlled position, which direct their rays through the controlled position to corresponding photosensitive elements. An electrical circuit controls drive means for the conveyor system by means of a voltage which in terms of absolute value and sign is a function of the number of photosensitive elements illuminated by the corresponding photoemitter elements.

4 Claims, 6 Drawing Figures

CONVEYOR SYSTEM FOR THE BULK TRANSFER OF BAR-SHAPED ARTICLES, PARTICULARLY CIGARETTES

BACKGROUND OF THE INVENTION

This invention relates to a conveyor system for the bulk transfer of bar-shaped articles, in particular cigarettes, and more particularly relates to those conveyors which directly connect one or more cigarette manufacturing machines to one or more cigarette packaging machines.

For reasons of simplicity, the present description will relate to the case of a single packaging machine fed by two manufacturing machines.

In said conveyor systems, the known means for supporting and conveying cigarettes are constituted by belts which define overall an assembly of channels along which the cigarettes disposed horizontally and piled one on the other are fed with continuous motion in a direction transverse to their longitudinal axes.

These channels, which lead from the manufacturing machines by way of paths generally comprising horizontal, vertical, curved and sometimes inclined portions, open into a hopper which feeds the cigarettes to the packaging machine.

A condition for the correct operation of the conveying system and consequently of the entire installation, is that the quantity of cigarettes present at any time in said channels is such as to prevent the feed to the packaging machine from becoming interrupted, and to prevent the cigarettes from becoming disposed in a disordered manner particularly in the descending portions of the conveyor.

A further condition for correct operation is that no pressure arises within the bulk of cigarettes flowing along said channels such as to cause build-up and damage to the cigarettes.

In order for these conditions to be continuously satisfied, known conveyor systems comprise, in the path of said channels, control and detection devices sensitive to any variation in the cigarette quantity caused for example by the different operating rates of the manufacturing machines and packaging machine, by the different efficiencies of said machines, and by faults in said conveyor system.

Said control devices are disposed at critical positions in the conveyor system (for example at its inlet, in the passage zones from one channel to another and at the point where several channels converge), and suitably adjust the speed of said belts in response to any deviation in the cigarette quantity from the preset or normal value.

More precisely, if the cigarette quantity falls below said value, the conveyor belts controlled by said control devices undergo a speed change relative to the normal speed such as to prevent the formation of empty spaces or gaps in the bulk of cigarettes.

In the same manner, if the cigarette quantity increases beyond said value, the conveyor belts are controlled by said control devices to a speed such as to prevent any build-up along the conveyor system and any dangerous pressure inside the bulk of cigarettes.

In conclusion, said control devices control the conveyor belt speed in such a manner that said conditions for correct operation are satisfied as the throughput of the conveyor system varies.

In order to ensure constant speed to the packaging machine even during said throughput variation, or more generally during any unbalance between the working rate of the manufacturing machines and packaging machine, known conveyor systems comprise at least one variable volume store which opens into the channels connecting said machines.

Control devices of the aforesaid type are therefore also disposed at the mouth of said store, and control its operation in such a manner as to keep the installation in perfect balance.

More particularly, the store receives either a cigarette delivery command or an absorption command depending upon whether the requirement of the packaging machine is respectively greater or less than the operating rate of the manufacturing machines.

From the aforegoing, it is apparent that said control devices govern the correct operation of the conveyor system and of the entire installation, and ensure delicate treatment of the cigarettes during all transfer operations.

The known art uses mechanical control devices of high sensitivity. In these, even very small variations in the cigarette quantity in the controlled zones are converted into movements of mechanical parts in direct contact with the cigarettes, and then into commands fed to the conveyor system drive means.

For example, control devices are known which are located inside substantially vertical wells disposed in positions where two or more channels of the conveyor system converge.

Variations in the cigarette quantity at these converging zones are converted into variations in the cigarette level inside the wells, and thus into vertical sliding of mechanical means in the control devices.

The same category comprises control devices which instead of detecting level variations detect pressure variations consequent on variations in the cigarette quantity in the controlled zone.

In this latter case, the mechanical elements disposed in contact with the cigarettes define wall portions of said channels, and can, for example, be in the form of flexible strips of plastics or fabric material, flexible belts mobile in the same direction as the motion of the bulk of cigarettes, or plates swivel-mounted on respective supports.

It is apparent that in all the cases considered, during the various stages of their control along the conveyor path the cigarettes are subjected to pressure and sometimes to friction and rolling, which can alter their structure and cause escape of tobacco.

SUMMARY OF THE INVENTION

The object of the present invention is therefore to provide a control device which combines high sensitivity with the advantage, over known devices, of controlling in such a manner as to prevent any mechanical stress arising which would damage the cigarettes.

A further object of the present invention is to provide a control device of the aforesaid type which is extremely simple, of small overall size relative to known devices, and which is applicable to known conveyor systems without the need to modify their structure.

These and further objects are all attained by the conveyor system for the bulk transfer of bar-shaped articles, in particular cigarettes, disposed horizontally and parallel to each other, from one or more manufacturing machines to one or more packaging machines, comprising conveyor means for supporting and transferring said articles with movement transverse to the axes thereof, and defining an assembly of channels connected to each other, and at least one control device for determining the quantity of said articles in a predetermined position, thereinafter called controlled position, of said conveyor system, and for controlling corresponding drive means for said conveyor means, wherein in said conveyor system said control device comprises a plurality of photoemitter elements disposed at different levels relative to said controlled position, an equal number of photosensitive elements each of which is disposed in the trajectory of the light ray which is emitted through said controlled position by a corresponding photoemitter element, and an electrical control circuit for said corresponding drive means providing a voltage which, in terms of absolute value and sign, is a function of the number of photosensitive elements which are in excited state, i.e. are illuminated by the corresponding photoemitter elements.

The novel features which are considered as characteristic of the invention are set forth in particular in the appended claims. The improved conveyor system itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
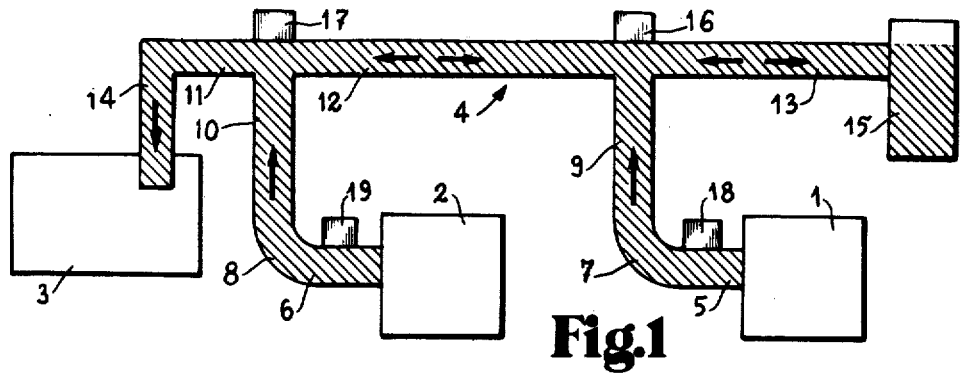
FIG. 1 is diagrammatic view of a conveyor system connecting two manufacturing machines to a packaging machine.

With reference to FIG. 1, the blocks indicated by 1 and 2 represent two cigarette manufacturing machines operating in parallel, and the block indicated by 3 indicates a cigarette packaging machine.

Said machines 1 and 2 are connected to the machine 3 by a conveyor system indicated by 4 and constituted by an assembly of channels along which the cigarettes piled one on the other are fed with continuous motion transverse to their longitudinal axes.

As already noted in the introduction, said channels are defined by the facing branches of endless belts and, in the curved portions, by belts in combination with rollers or pulleys.

The conveyor system 4 leads to the manufacturing machines 1 and 2 by way of a horizontal channel 5 and a horizontal channel 6 respectively. Said channels 5 and 6 are connected by curved channels, indicated respectively by 7 and 8, followed by vertical channels indicated respectively by 9 and 10, to a common horizontal duct defined from left to right by three channels 11, 12 and 13, when viewing FIG. 1.

More precisely, the channel 11 lies between a vertical feed duct 14 for the hopper of the packaging machine 3 and the upper or outlet end of the vertical channel 10; the channel 12 lies between the outlet of the channel 10 and the upper or outlet end of the vertical channel 9; and the channel 13 lies between the outlet of the vertical channel 9 and a variable volume store 15 for compensating for any unbalance in the operational rates of the manufacturing machines 1 and 2 and the packaging machine 3.

At the converging zones of the channels 9, 12 and 13 and of the channels 10, 11 and 12 there are provided two control devices 16 and 17 respectively, for determining variations in the cigarette quantity in said zones.

In the same manner, two devices 18 and 19 of the aforesaid type are disposed between the channel 5 and the curved channel 7, and between the channel 6 and the curved channel 8 respectively.

Figure 2:
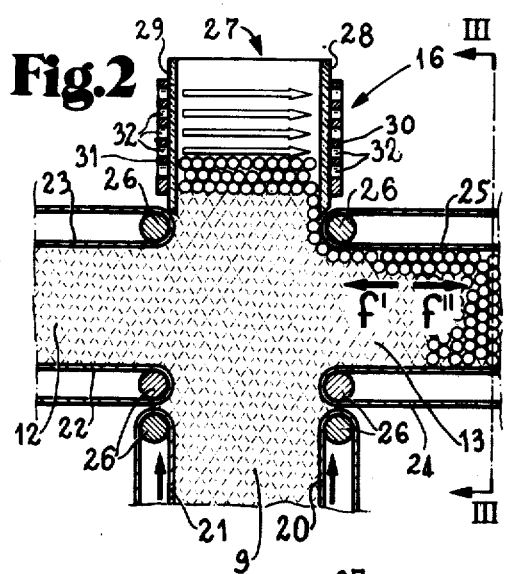
FIG. 2 is a sectional view to an enlarged scale of a detail of FIG. 1, on the line II—II of FIG. 3.
Figure 3:
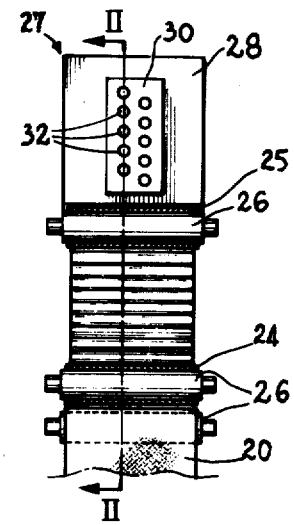
FIG. 3 is a sectional view of FIG. 2 on the line III-—III.

FIGS. 2 and 3 show in greater detail the converging zone of the channels 9, 12 and 13 defined respectively by three pairs of belts 20 and 21, 22 and 23, 24 and 25.

Each of these belts passes endlessly around end rollers 26 with their axis normal to the plane of the drawing.

At least one roller of each belt is rotated about its axis by drive means, not shown in FIGS. 2 and 3.

The control device 16 operates at a vertical well 27 overlying the channels 12 and 13 and aligned with the channel 9.

The well 27 is open upperly, communicates at its lower end with the interior of the conveyor system 4, and is bounded on those sides facing the channels 12 and 13 by walls 28 and 29 of light-transparent material.

A plate 30 and a plate 31 are fitted on the outside of the well 27 to the two walls 28 and 29 respectively, and both are provided with ten holes 32 and are disposed symmetrically about the intermediate vertical plane between said walls.

As shown in FIG. 3, the holes 32 in the plate 30 are aligned at a constant pitch along two vertical rows of five holes each. These rows are staggered vertically one to the other, so that overall the holes 32 are in a zig-zag arrangement, with a pitch which is half that of the individual rows.

The holes provided in the plate 29, which are not visible in FIG. 3, have an arrangement which is the specular image of the arrangement described for the plate 28.

Figure 6:
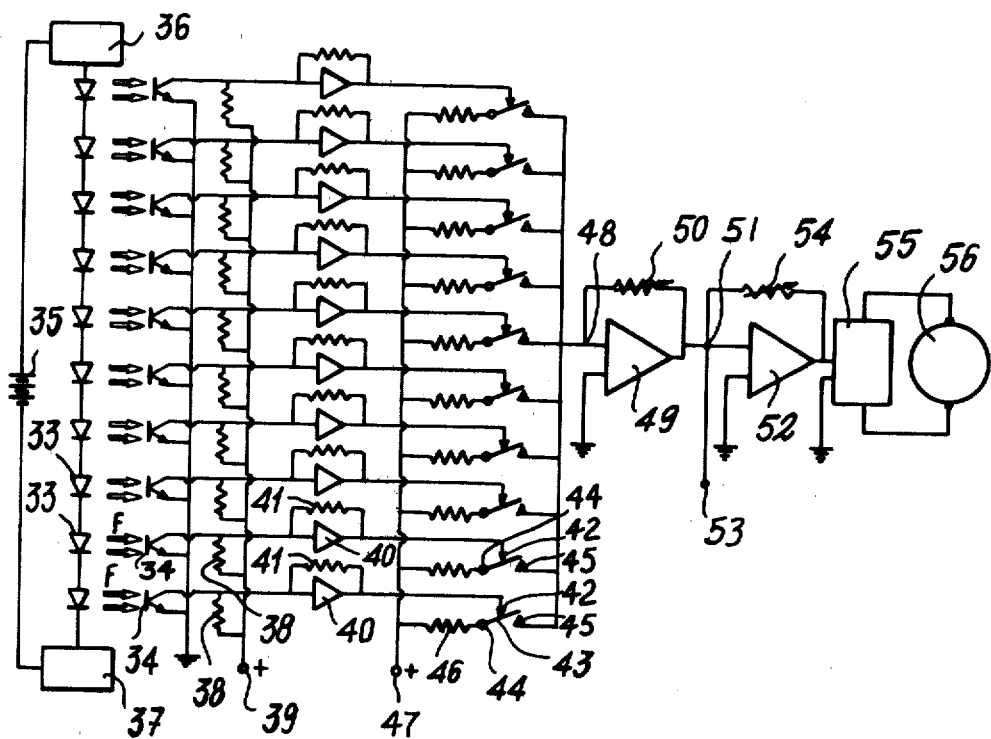
FIG. 6 is a diagrammatic view of an electrical circuit forming part of the conveyor system according to the present invention.

The control device according to the present invention includes the electrical circuit shown in FIG. 6, which is described hereinafter with reference to the control device 16, and which controls the operation of the connection channel 13 to the compensation store 15.

The holes 32 of one of the two plates, for example the plate 30, act as seats for photoemitter elements, while the holes 32 of the plate 31 house photosensitive elements, each of which is disposed in the trajectory of a corresponding photoemitter element.

In the described embodiment, the photoemitter elements consist in infrared radiation emitter diodes 33 (for example of the SIEMENS CQY17 type) and the photosensitive elements consist of phototransistors 34 (for example of the SIEMENS BPX43 type).

The diodes are connected in series and are supplied by a direct current generator indicated by 35.

This feed takes place through a current stabilizer circuit of known type shown diagrammatically as the block 36, and a safety switch shown diagrammatically as the block 37.

The purpose of the switch 37 is to halt the various machines comprising the installation should one or more diodes 33 break.

The rays emitted by each diode 33 (shown diagrammatically by the arrows f) are directed towards the corresponding phototransistors 34 connected to earth through the respective emitters.

The collector of each phototransistor 34 is connected through a transistor 38 to the positive pole 39 of a direct current generator, and is also directly connected to the input of an amplifier 40 provided with a feedback resistor 41.

The output of each amplifier 40 is directly connected to a control input 42 of a solid state switch (for example of the FAIRCHILD 4016 B type), shown diagrammatically as a normally open connection contact 43 between an input terminal 44 and an output terminal 45.

The input terminals 44 are connected in parallel, through resistors 46, to the same positive pole 47 of a direct current generator, while the output terminals 45 converge to an input terminal 48 of an adder circuit in the form of an operational amplifier 49.

As is known, said solid state switches pass from a blocked state (opening of the contact 43) to a conducting state (closure of the contact 43) when a voltage of a determined value is applied to the control input 42.

For each switch 43 of the circuit considered, this occurs when the corresponding phototransistor 34 is struck by the rays f emitted by the respective emitter diode 33.

Said operational amplifier 49, supplied at its input by a voltage proportional to the number of switches 43 in their closed state, adds said voltage, with a gain adjustable by means of a feedback resistor 50.

In the case considered it is assumed that the contribution provided by each switch 43 to the output voltage of the amplifier is 0.6 V.

This means that said output voltage will have values between a minimum of 0 v (the ten phototransistors obscured and a maximum of 6 V (the ten phototransistors illuminated), varying in steps of 0.6 V each.

The output of the amplifier 49 is connected to an input terminal 51 of a second adder circuit constituted by an operational amplifier 52. The negative pole 53 of a generator providing a direct current reference voltage is connected to the same terminal 51.

In the present case, this voltage will have a value of −3 V. The operational amplifier 52, with its gain defined by a feedback resistor 54, algebraically adds said reference voltage to the output voltage of the amplifier 49.

The same amplifier 52 pilots a circuit, indicated diagrammatically by the block 55 of known type, for operating a two-direction motor 56 which drives the conveyor means for the channel 13.

In conclusion, the circuit comprising the switches 43, the operational amplifier 49 and the operational amplifier 52, constitutes the control circuit for the circuit 55. This latter is supplied by a voltage which in terms of absolute value and sign is a function of the number of phototransistors in their conducting state, i.e. struck by the rays from the corresponding photoemitter elements. The behaviour of the control device 16 will now be considered with the installation in operation.

If the operating rate of the manufacturing machines 1 and 2 and of the packaging machine 3 are perfectly balanced, then as known there is no need for the compensation store 15 to operate.

Under such ideal operating conditions, the level of cigarettes in the well 27 is therefore such as to maintain the drive motor 56 for the belts 24 and 25 in a blocked state by way of the electrical circuit described.

As stated heretofore with regard to said circuit, the condition for the motor 56 to remain at rest is the presence of zero voltage at the output of the operational amplifier 52, and thus the presence of two voltages of equal absolute value and of opposite sign at its input terminal 51.

This condition is satisfied when a voltage of 3 V is present at the output of the operational amplifier 49, i.e. when the level of the cigarette in the well lies along a line, defined as the balance line, such as to obscure the lower five phototransistors 34.

When the cigarette production rate falls (for example because of one or both of the manufacturing machines 1 and 2 stopping), the level of cigarettes in the well 27 falls below said balance line, with a consequent increase in the number of phototransistors 34 illuminated.

A positive voltage then becomes established at the output of the operational amplifier 52, because of the fact that the positive output voltage (under these circumstances greater than 3 V) of the amplifier 49 prevails over the negative reference voltage.

This voltage is fed through the circuit 55 to the motor 56, which rotates in a direction of rotation such as to cause the facing branches of the belts 24 and 25 to move in the direction of the arrow f', with a speed proportional to the number of phototransistors 34 illuminated below said balance line. The store 15 delivers cigarettes for the entire time necessary for balanced conditions inside the well 27 to become re-established, or in other words until the output voltage of the operational amplifier 52 becomes zero.

In the opposite case, i.e. when for example because of stoppage or a fall in the operating rate of the packaging machine 3 the cigarette level inside the well 27 increases, further phototransistors 34 in addition to the five disposed below the balance line are obscured.

Consequently, a negative voltage is established at the output of the operational amplifier 52 because of the fact that the negative reference voltage prevails over the output voltage of the amplifier 49 (under these circumstances less than 3 V).

This voltage is fed by way of the circuit 55 to the motor 56, which rotates in the opposite direction of rotation to the preceding, i.e. so as to cause the facing branches of the belts 24 and 25 to move in the direction of the arrow f'' with a speed proportional to the number of phototransistors 34 obscured above said balance line.

Cigarettes are absorbed by the store 15 until the balanced level is reestablished in the well 27.

The aforesaid description with regard to the control device 16 disposed at the convergence of the channels 9,12,13 is also valid in general for the other control devices of the conveyor system 4.

With particular reference to the control devices 18 and 19, it should be noted that in contrast to the example described heretofore, these are disposed at the inlet of the channels through which cigarettes flow in one direction only.

Considering for example the control device 18, its purpose is to control the speed of the single-direction motor for the conveyor means for the channels 7 and 9 as a function of variations in the cigarette level in the controlled zone.

More precisely, assuming determined working conditions, then if the cigarette level increases in the controlled zone, the motors of the conveyor means for the channels 7 and 9 receive a speed increase command from the control device 18.

In the opposite case, i.e. if the cigarette level falls, said motors receive a speed reduction command from the control device 18.

In order to supply said single-direction motor with a voltage having the same sign under all operating conditions, the pole 53 connected to the input terminal 51 of the amplifier 52 in the electrical circuit for the device 18 is provided with a constant voltage level of −6 V.

Consequently, a voltage is present at the output of the operational amplifier 52 which varies in steps between zero when all the switches 43 are closed (minimum cigarette level in the controlled zone) and a maximum value when all the switches 43 are open (maximum cigarette level in the controlled zone).

In this manner the described control device provides the conditions for the correct operation of the conveyor system 4 as described in the introduction, i.e. avoiding build-up and excessive pressure within the bulk of cigarettes on the one hand, and feed interruptions on the other hand.

Figure 4:
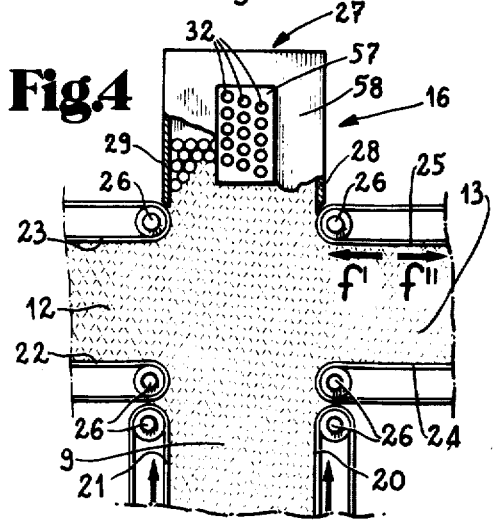
FIG. 4 is a modified version of the detail of FIG. 2.

FIG. 4 shows a different embodiment of the control device 16 disposed at the convergence of the channels 9, 12 and 13.

In this case, in contrast to that described heretofore, the plates housing the photosensitive elements and photoemitter elements are fitted to those walls of the well 27 which are normal to the walls 28 and 29.

The only plate visible in FIG. 4 and the respective support wall are indicated respectively by the numerals 57 and 58.

The control operation consequently takes place in this embodiment parallel to the longitudinal axes of the cigarettes.

It should also be noted that in the plates 57, the holes 32 for housing the photoemitter elements and photosensitive elements are disposed in three vertical rows of five holes each, offset from each other instead of in two rows as in the preceding case.

Compared with the arrangement of FIG. 3, this hole arrangement gives the device 16 a greater sensitivity, i.e. the capability of evaluating smaller level variations within the well 27.

Figure 5:
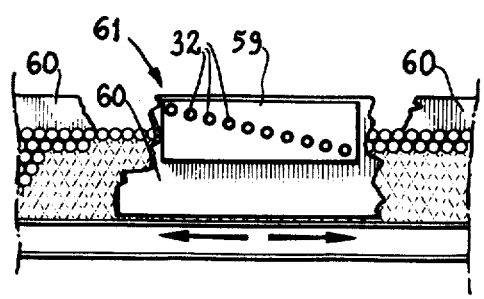
FIG. 5 is a detail of FIG. 1 to an enlarged scale.

In FIG. 5, the plates housing the photoemitter elements and photosensitive elements, indicated by 59 (only one of which is visible in the figure) are fitted to opposing lateral walls 60 of one of the horizontal channels of the conveyor system 4, instead of to a well.

In contrast to the cases described heretofore, the control device of which the plates 59 form part, and indicated overall by 61, determines the level of the bulk of cigarettes moving along said channel instead of the bulk which slides vertically between the walls of a well.

In this latter embodiment, the holes 32 are disposed along a single inclined line.

It should also be noted that when high sensitivity of the control devices according to the invention is not required, the holes 32 can for example be disposed along a single vertical line.

In a further embodiment, not shown in the figures, the two plates 30 and 31 housing the photoemitter elements and photosensitive elements can be disposed at different levels instead of at the same level (as shown in FIG. 2). In this case, the luminous rays emitted by the photoemitter elements are directed towards corresponding photosensitive elements follow an inclined path instead of a horizontal path.

What I claim is:

1. An improved conveyor system for the bulk transfer of articles, such as cigarettes, from a manufacturing machine to a packaging machine, comprising:

conveyor means for supporting and transferring said articles from said manufacturing machine to said packaging machine and in a direction transverse thereto at a predetermined position;

means for controlling the rate of movement of said articles along said conveying means; and a control device for controlling the quantity of said articles at said predetermined position, said control device including:

a plurality of light emitting elements;

a plurality of light detectors, each spaced from and aligned with a corresponding one of said light emitting elements for receiving a light beam therefrom and for producing an output signal;

two vertical plates extending in the transverse direction and on opposite sides of the predetermined position, one plate having means for supporting at least one array of said light emitting elements and the other plate having means for supporting a corresponding array of light detectors; and circuit means for controlling said drive means in accordance with the output signals;

whereby the level of said articles in the predetermined position is measured by the number of intercepted light beams, and the output signals are applied to said circuit means to control the flow rate of said articles.

2. An improved conveyor system according to claim 1, wherein said one plate includes plural arrays of light emitting elements and the other plate includes corresponding arrays of light detectors, said arrays of light emitting elements and light detectors extending in the transverse direction.

3. An improved conveyor system according to claim 1, wherein said one plate includes plural arrays of light emitting elements and the other plate includes corresponding arrays of light detectors, said arrays of light emitting elements and light detectors extending in a direction inclined with respect to the transverse direction.

4. An improved conveyor system according to claim 1, wherein said conveying means includes a plurality of channels for conveying articles from a plurality of manufacturing machines to a plurality of packaging machines.

* * * * *